US012789268B2

(12) United States Patent
Yue et al.

(10) Patent No.: US 12,789,268 B2
(45) Date of Patent: Nov. 10, 2026

(54) BIT HOLDER FOR A POWER TOOL

(71) Applicant: MILWAUKEE ELECTRIC TOOL CORPORATION, Brookfield, WI (US)

(72) Inventors: Brian J. Yue, Weston, MA (US); John Knox, Geneva, IL (US); Mason Dieck, Menomonee Falls, WI (US); Oliver Waldron, Milwaukee, WI (US); Harry T. Ward, Mequon, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 572 days.

(21) Appl. No.: 18/142,695

(22) Filed: May 3, 2023

(65) Prior Publication Data

US 2023/0356434 A1 Nov. 9, 2023

Related U.S. Application Data

(60) Provisional application No. 63/338,297, filed on May 4, 2022.

(51) Int. Cl.
*B23B 51/04* (2006.01)
*B28D 1/04* (2006.01)

(52) U.S. Cl.
CPC .......... *B23B 51/0473* (2013.01); *B28D 1/041* (2013.01)

(58) Field of Classification Search
CPC ....... B23B 51/04; B23B 51/0473; B27B 5/32; B28D 1/041
See application file for complete search history.

(56) References Cited

U.S. PATENT DOCUMENTS 7,104,738 B2 * 9/2006 Cantlon .............. B23B 51/0473 408/239 R
7,517,179 B2 * 4/2009 Miller ..................... B23B 31/06 408/239 R
8,434,976 B2 * 5/2013 Kelleher ............. B23B 51/0473 408/239 R
8,721,236 B2 * 5/2014 Kazda ................. B23B 51/0473 408/239 R
12,377,472 B2 * 8/2025 Grennhag ............... B23B 31/11

* cited by examiner

*Primary Examiner* — Eric A. Gates
(74) *Attorney, Agent, or Firm* — Michael Best & Friedrich LLP

(57) ABSTRACT

A chuck configured to engage a drill bit. The chuck includes a socket body, a first annulus, a second annulus, and a sleeve. The socket body includes a tool end configured to be coupled to a tool and a tool bit end configured to be coupled with the drill bit. The second annulus is selectively movable relative to the first annulus. The sleeve is selectively movable relative to the socket body between a home position in which the second annulus presses upon the drill bit to secure the drill bit to the tool end and a retracted position in which the second annulus is movable relative to the socket body and the drill bit is movable relative to the socket body.

19 Claims, 6 Drawing Sheets

BIT HOLDER FOR A POWER TOOL

CROSS-REFERENCE TO RELATED APPLICATION

This application claims priority to U.S. Provisional Patent Application No. 63/338,297, filed May 4, 2022, the entire content of which is incorporated herein by reference.

BACKGROUND

Core drills, as well as some other power tools, may include an output spindle that receives and retains a tool bit via a threaded connection between the output spindle and the tool bit. In particular, the tool bit may be threaded on to the output spindle until a rear end of the tool bit engages a flange or stop on the output spindle. The threaded connection is typically oriented such that torque applied to the tool bit acts in a tightening direction of the threaded connection, to prevent the tool bit from loosening. When it is desired to change the tool bit, however, the additional torque applied to the threaded connection during operation of the power tool may load the threads and apply additional axial force to the stop, making it very difficult to remove the tool bit. Typically, a user may need to use an additional tool, such as a wrench, to apply sufficient torque to the tool bit to loosen the threaded connection. This results in inefficiencies when changing tool bits.

FIELD OF THE DISCLOSURE

The present invention relates to bit holders for power tools, and more particularly to bit holders operable without secondary tools.

SUMMARY OF THE DISCLOSURE

In one aspect, the disclosure provides a bit holder comprising a main body including a attachment end configured to be coupled to an output spindle of a power tool, and a tool bit end configured to be threadably coupled to a tool bit. The bit holder further includes a first ring and a second ring selectively movable relative to the first ring. The second ring defines a stop configured to engage the tool bit when the tool bit is coupled to the tool bit end. The second ring is movable to reduce a friction force between the tool bit and the stop.

In another independent aspect, the disclosure provides a bit holder comprising a main body, a first ring, a ball, a second ring, and a sleeve. The main body includes an attachment end configured to be coupled to an output spindle of a power tool and a tool bit end configured to be threadably coupled to a tool bit. The first ring has a hole. The ball is positioned at least partially within the hole. The second ring is movable relative to the first ring. The sleeve includes a first inner surface, a second inner surface, and a transition surface between the first inner surface and the second inner surface. Each inner surface is configured to abut the ball. The first inner surface has a first diameter larger than a second diameter of the second inner surface. The sleeve is movable between a home position and a retracted position. In the home position, the sleeve prevents outward movement of the ball, such that the ball axially secures the second ring relative to the first ring. In the retracted position, the first inner surface is aligned with the hole to permit the ball to move away from the second ring and thereby permit movement of the second ring relative to the first ring.

In another independent aspect, the disclosure provides a power tool including a motor coupled to an output spindle and configured to generate torque to rotate the output spindle. The output spindle is configured to transmit the torque to a tool bit coupled to the output spindle by a bit holder. The bit holder includes a main body including an attachment end coupled to the output spindle and a tool bit end threadably coupled to the tool bit. The bit holder further includes a first ring and a second ring selectively movable relative to the first ring. The second ring defines a stop configured to engage the tool bit. The second ring is movable to reduce a friction force between the tool bit and the stop.

Other aspects of the disclosure will become apparent by consideration of the detailed description and accompanying drawings.

Before any embodiments of the disclosure are explained in detail, it is to be understood that the invention is not limited in its application to the details of construction and the arrangement of components set forth in the following description or illustrated in the following drawings. The disclosure is capable of other embodiments and of being practiced or of being carried out in various ways.

DETAILED DESCRIPTION

Figure 1:
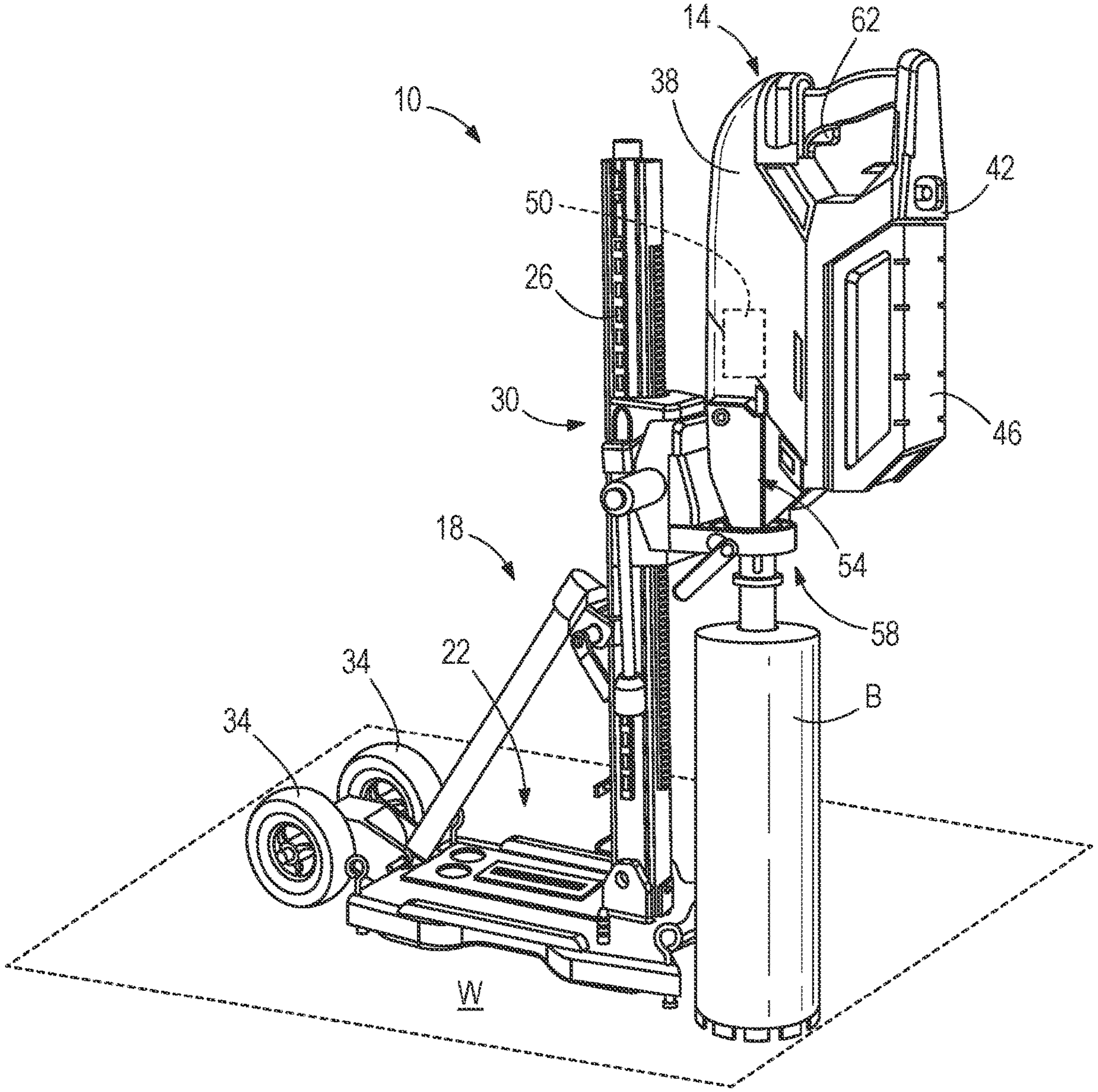
FIG. 1 is a perspective view of a power tool in the form of a core drill in accordance with an embodiment of the invention, the core drill including an output spindle coupled to a tool bit via a bit holder.

The present disclosure provides, among other things, a bit holder that allows for quicker removal of a threaded tool bit without the user of any external tools. FIG. 1 illustrates a core drill assembly 10 including a power tool 14, which in the illustrated embodiment includes a core drill 14, and a stand 18. The core drill 14 is selectively supported upon the stand 18, and is configured to make a cut in a workpiece W. The illustrated core drill 14 may be usable in a mounted configuration supported by the stand 18 or in a free-standing configuration in which a user supports the core drill 14.

The stand 18 includes a base portion 22, a rail 26 upstanding from the base portion 22, a translation unit 30 configured to translate the core drill 14 along the rail 26, and a pair of wheels 34. The wheels 34 are pivotably coupled to the base portion 22, and are configured to support the stand 18 upon the workpiece W. A user may grasp and tilt the core drill assembly 10 such that the base portion 22 is elevated from the workpiece W. Once elevated, the wheels 34 may support the core drill 14 and the stand 18, and the user may move the core drill assembly 10 to a desired position on the workpiece W. In the free-standing configuration with the core drill 14 removed from the stand 18, the user can move the core drill 14 to the desired position relative to the workpiece W.

The core drill 14 includes a housing 38 with a power receptacle 42. The power receptacle 42 is configured to receive power from a power source 46. In the illustrated embodiment, the power source 46 is a battery pack. However, other power sources 46 may be used, such as alternating current power sources 46. The power source 46 is electrically coupled and configured to pass current to a motor 50 positioned within the housing 38. The motor 50 is operable to drive an output spindle 54, either directly or via a drivetrain (not shown), which may include one or more gear reductions, transmissions (e.g., planetary transmissions), or the like. The spindle 54 is coupled to a bit holder 58. The bit holder 58 is configured to selectively secure a tool bit B to the output spindle 54. Exemplary tool bits B may include, but are not limited to, hole cutting or coring bits. The core drill 14 includes a trigger 62 to control operation of the motor 50. When the trigger 62 is depressed, or as a result of another triggering condition (i.e., the trigger 62 being continuously held), current is transmitted from the power source 46 to the motor 50. At this point, the motor 50 is energized, and the output spindle 54 rotates. The output spindle 54 turns the bit holder 58 and thus the tool bit B. When the trigger 62 is released, the motor 50 is de-energized.

The tool bits B may be dimensioned to cut holes having varying diameters of, for example, between ⅝ inches and 8 inches in the workpiece W. The tool bit B may be removed from the bit holder 58 and another replacement or differently sized tool bit B may be coupled to the bit holder 58 for subsequent use. Exemplary workpieces W may include, but are not limited to, concrete and/or rebar reinforced concrete. The tool bit B may be made at least in part by diamonds, carbides, and/or any other material(s) suitable to cut the concrete and/or concrete having rebar reinforcement or other material(s). Other materials of the tool bit B may be selected to cut differing materials of the workpiece W. The tool bit B is be configured to be used in a "wet" environment in which a cutting fluid (e.g., water) is applied to the tool bit B and/or the workpiece W during a cutting operation of the core drill 14. Other tool bits B configured for dry use without cutting fluid may be used.

Once the bit holder 58 engages the user-selected tool bit B, the user pulls the trigger 62, and the tool bit B is rotated. The user then advances the core drill 14 into the workpiece W to make a hole (or other cut) therein. The user may actuate the translation unit 30 to move the core drill 14 along the rail 26 and into the workpiece W a desired distance (e.g., through the workpiece W). The translation unit 30 may be actuated (i.e., advanced and retreated) multiple times during a single cut.

Figure 2:
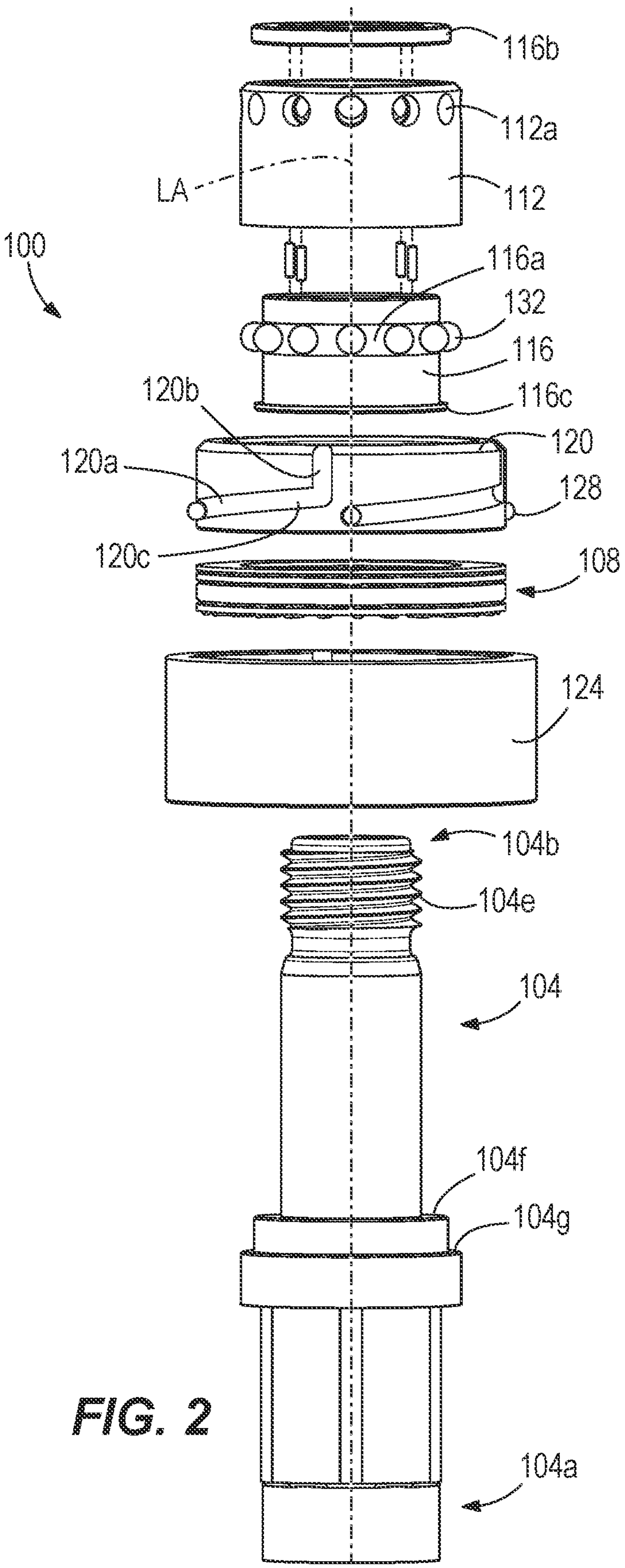
FIG. 2 is an exploded view of a bit holder for use with the core drill of FIG. 1.
Figure 3:
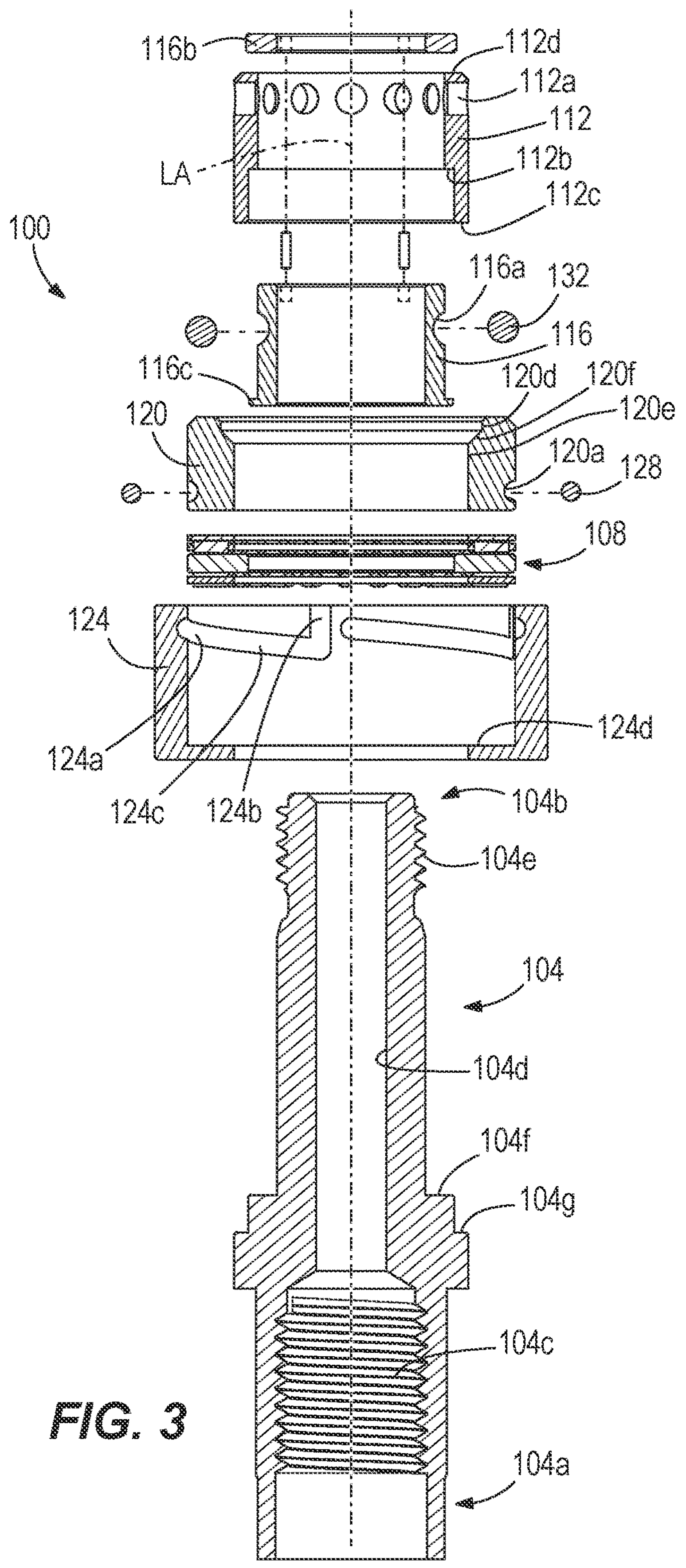
FIG. 3 is an exploded and section view of the bit holder.

FIGS. 2-3 illustrate a bit holder 100 in accordance with the disclosure. The bit holder 100 may be incorporated into the core drill 14 as the bit holder 58. In other embodiments, the bit holder 100 may be used with other types of power tools.

The bit holder 100 includes a main body 104, a thrust bearing 108, an outer (i.e., first) ring 112, an inner (i.e., second) ring 116, an inner sleeve 120, and an outer sleeve 124. The bit holder 100 further includes key balls 128 positioned between the inner sleeve 120 and the outer sleeve 124. Finally, the bit holder 100 includes a plurality of locking balls 132 which are described in detail below.

The main body 104 includes an attachment end 104*a* configured to engage the output spindle 54 of the core drill 14 (e.g., via a threaded connection) and an opposite tool bit end 104*b* configured to engage the tool bit B. The attachment end 104*a* and the tool bit end 104*b* are positioned opposite each other along a longitudinal axis LA of the bit holder 100. The attachment end 104*a* includes internal threads 104*c* (FIG. 3). The internal threads 104*c* are in communication with an internal bore 104*d* of the main body 104. The illustrated internal bore 104*d* is a through-bore which extends from the attachment end 104*a* to the tool bit end 104*b*. The internal bore 104*d* may therefore allow cutting fluid, such as water, to flow through the main body during use.

The main body 104 further includes external threads 104*e* (FIGS. 2, 3) adjacent the tool bit end 104*b*. The external threads 104*e* may engage corresponding threads of the tool bit B. In some embodiments, the internal threads 104*c* match the external threads 104*e*. This allows the attachment end 104*a* to interface with any existing tool having an output spindle configured to receive the threads of the tool bit B. In other words, the bit holder 100 may be usable as an adapter for existing tools.

The main body 104 further includes a first shoulder 104*f* and a second shoulder 104*g*. The shoulders 104*f*, 104*g* have differing outer diameters when compared to the remainder of the main body 104. More specifically, each of the first shoulder 104*f* and the second shoulder 104*g* have outer diameters which are larger than the remainder of the main body 104. The second shoulder 104*g* has a diameter larger than a diameter of the first shoulder 104*f*.

With continued reference to FIGS. 2 and 3, the outer (i.e., first) ring 112 includes a plurality of holes 112*a*. The holes 112*a* are dimensioned to receive the locking balls 132. The holes 112*a* may be directed toward and separately may be evenly circumferentially spaced about the longitudinal axis LA. Any number of holes 112*a*, and any number of locking balls 132 are possible. The holes 112*a* extend through the annular sidewalls of the outer ring 112. The outer ring 112 further includes an outer ring shoulder 112*b* defined between axial ends of the outer ring 112 along the longitudinal axis LA. Finally, the outer ring 112 includes a first end surface 112*c* and an opposite second end surface 112*d*. In the illustrated embodiment, the end surface 112*c* is positioned opposite the ring shoulder 112*b* when compared to the holes 112*a*. Other arrangements may be possible.

Figure 4:
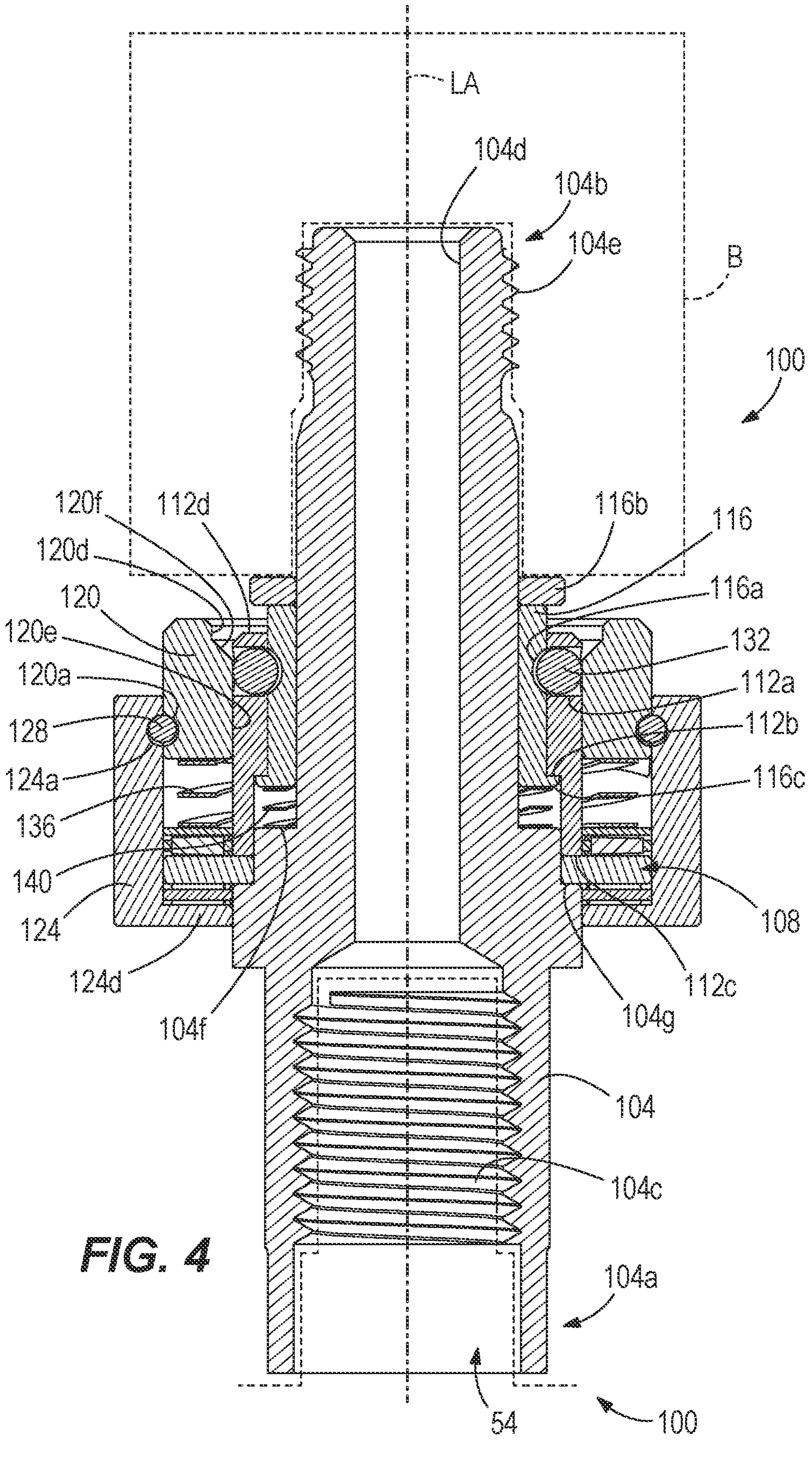
FIG. 4 is a section view of the bit holder in a home position.

Referring to FIG. 4, the thrust bearing 108 is positioned radially between the main body 104 and the outer sleeve 124. The first end surface 112*c* of the outer ring 112 abuts the thrust bearing 108 axially between the first shoulder 104*f* and the second shoulder 104*g* and radially between the socket 104 and the thrust bearing 108. The bit holder 100 further includes an inner sleeve spring 136 and an inner ring spring 140. The inner sleeve spring 136 is positioned between radially between the outer ring 112 and the outer sleeve 124 and axially between the thrust bearing 108 and the inner sleeve 120. The inner sleeve spring 136 is configured to bias the inner sleeve 120 to toward a home position illustrated in FIG. 4 and described in greater detail below.

FIGS. 2 and 3 further illustrate the inner (i.e., second) ring 116. The inner ring 116 includes an inner annular groove 116*a*, a first end projection or stop 116*b*, and a second end projection 116*c*. The inner annular groove 116*a* is provided on an outer surface of the inner ring 116. In other words, the inner annular groove 116*a* is a void on the outer surface of the inner ring 116 which extends towards the longitudinal axis LA. As will be described in detail below, the inner annular groove 116*a* is dimensioned to receive a portion of the locking balls 132.

FIGS. 2 and 3 also illustrate the inner sleeve 120. With reference to FIG. 2, the inner sleeve 120 has an inner sleeve groove 120*a*. The inner sleeve groove 120*a* is positioned on an outer surface of the inner sleeve 120 such that the inner sleeve groove 120*a* extends in a direction towards the longitudinal axis LA. The inner sleeve groove 120*a* has an axial portion 120*b* extending in a direction parallel to the longitudinal axis LA and a helical portion 120*c* in communication with the axial portion 120*b* and extending helically about the longitudinal axis LA. Otherwise dimensioned inner sleeve grooves 120*a* are possible. For example, the helical portion 120*c* may be replaced with a radial portion (not shown) extending only radially along the longitudinal axis LA. The radial portion may be in communication with the illustrated axial portion 120*b* and another axial portion 120*b* at the opposite end of the radial portion. Other similar arrangements are possible. The illustrated embodiment includes four inner sleeve grooves 120*a*. The illustrated inner sleeve grooves 120*a* are evenly circumferentially spaced about the longitudinal axis (by 90 degrees). Each of the inner sleeve grooves 120*a* receives one of the key balls 128 such that the key balls 128 are sandwiched between the inner sleeve 120 and the outer sleeve 124.

With reference to FIG. 3, the inner sleeve 120 has a first inner surface 120*d*, a second inner surface 120*e*, and a transition surface 120*f* between the first inner surface 120*d* and the second inner surface 120*e*. The first inner surface 120*d* has an inner diameter larger than an inner diameter of the second inner surface 120*e*. Each of the first inner surface 120*d*, second inner surface 120*e*, and the transition surface 120*f* are configured to abut (i.e., press against) the locking balls 132.

FIG. 3 best illustrates the outer sleeve 124. The outer sleeve 124 includes an outer sleeve groove 124*a*. The outer sleeve groove 124*a* is positioned on an inner surface of the outer sleeve 124, and the outer sleeve groove 124*a* extends radially outwardly from the longitudinal axis LA into the outer sleeve 124. The outer sleeve groove 124*a* includes an axial portion 124*b* extending in a direction parallel to the longitudinal axis LA and a helical portion 124*c* in communication with the axial portion 124*b* and extending helically about the longitudinal axis LA. The axial portion 124*b* of the outer sleeve groove 124*a* is in communication with an axial end of the outer sleeve 124. The outer sleeve 124 further includes an end rim 124*d* opposite the outer sleeve groove 124*a*. Each of the outer sleeve grooves 124*a* is aligned with each of the inner sleeve grooves 120*a* such that the inner sleeve grooves 120*a* and the outer sleeve grooves 124*a* together receive one of the key balls 128 sandwiched between the inner sleeve 120 and the outer sleeve 124. While the illustrated embodiment includes the outer sleeve 124, it is envisioned that a similar bit holder without an outer sleeve 124 may be designed.

FIG. 4 illustrates the bit holder 100 in a home position in which the bit holder 100 secures the tool bit B to the output spindle 54. Accordingly, the bit holder 100 holds the tool bit B relative to the output spindle 54, and the bit holder 100 transmits torque from the output spindle 54 to the tool bit B and ultimately the workpiece W. In this position, the tool bit B is threaded on to the threads 104*e* until the tool bit B presses against the first end projection 116*b*. The inner ring 116 is held in its illustrated axial position by the locking balls 132. The locking balls 132 are received in the holes 112*a* and press against the second inner surface 120*e*. The locking balls 132 are pressed by the second inner surface 120*e* into alignment with the inner annular groove 116*a*. In this position, the inner sleeve 120 projects from the outer sleeve 124 in a direction along the longitudinal axis LA such that the second inner surface 120*e*, and not the first inner surface 120*d* is in the same position along the longitudinal axis LA as the locking balls 132.

Figure 5:
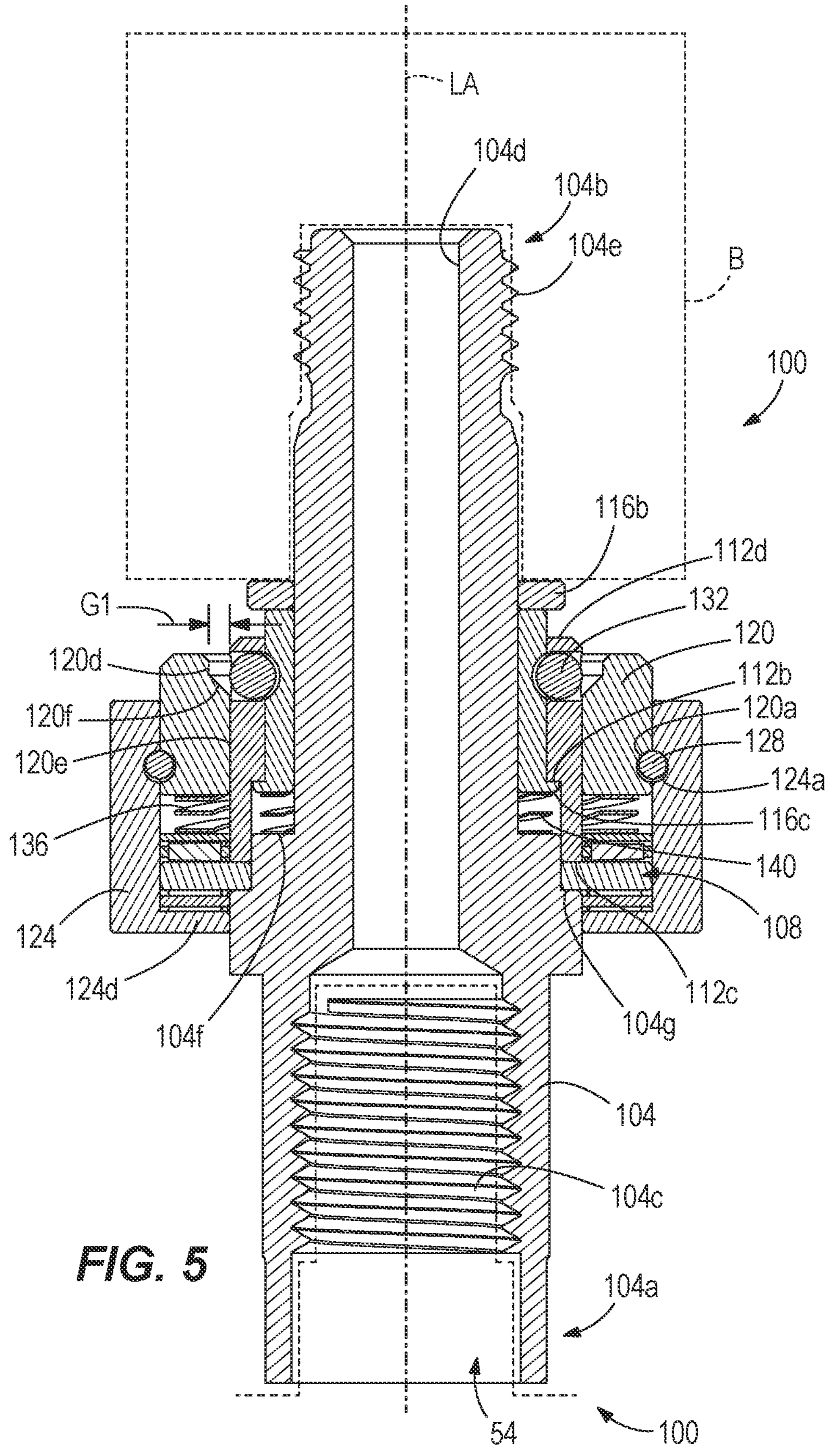
FIG. 5 is a section view of the bit holder in a retracted position.

FIG. 5 illustrates a retracted position of the bit holder 100. To transition between the home position (FIG. 4) and the retracted position (FIG. 5), a user must apply an axial force in a direction at least partially parallel with the longitudinal axis LA to overcome the inner sleeve spring 136 bias, and to move the inner sleeve 120 downward. To do so, in the illustrated embodiment, the user grasps and rotates the outer sleeve 124 in a loosening direction. During this movement, the key balls 128 are guided along the outer sleeve groove 124*a* and the inner sleeve groove 120*a*. More specifically, the key balls 128 are guided along the helical portions 120*c*, 124*c* of the outer sleeve groove 124*a* and inner sleeve groove 120*a*, respectively. The key balls 128 and grooves 124*a*, 120*a* define a ball screw mechanism that translates the rotation of the outer sleeve 124 into axial movement of the inner sleeve 120 and provide a mechanical advantage to facilitate moving the inner sleeve 120 against the force of the inner sleeve spring 136.

During this transition, the locking balls 132 may contact (i.e., abut, press against) the transition surface 120*f* of the inner sleeve 120. Once transitioned to the retracted position (FIG. 5), the first inner surface 120*d* is positioned at the same axial position as the locking balls 132. In other words, in a plane perpendicular to the longitudinal axis LA, the locking balls 132 are aligned with the first inner surface 120*d* in the retracted position (FIG. 5). This reveals a radially extending gap G1 between the locking balls 132 and the first inner surface 120*d*.

In both the home position (FIG. 4) and the retracted position (FIG. 5), the position of the inner ring 116 relative to the main body 104 and the tool bit B is the same. The first end projection 116*b* abuts the tool bit B, and the second end projection 116*c* is seated against the outer ring shoulder 112*b*. The first end projection 116*b* is spaced from the second end surface 112*d*. The inner ring spring 140 is positioned radially between the main body 104 and the outer ring 112 and positioned axially between the first shoulder 104*f* and the second end projection 116*c*. The inner ring spring 140 biases the inner ring 116 to an engaged position (FIGS. 4, 5).

Figure 6:
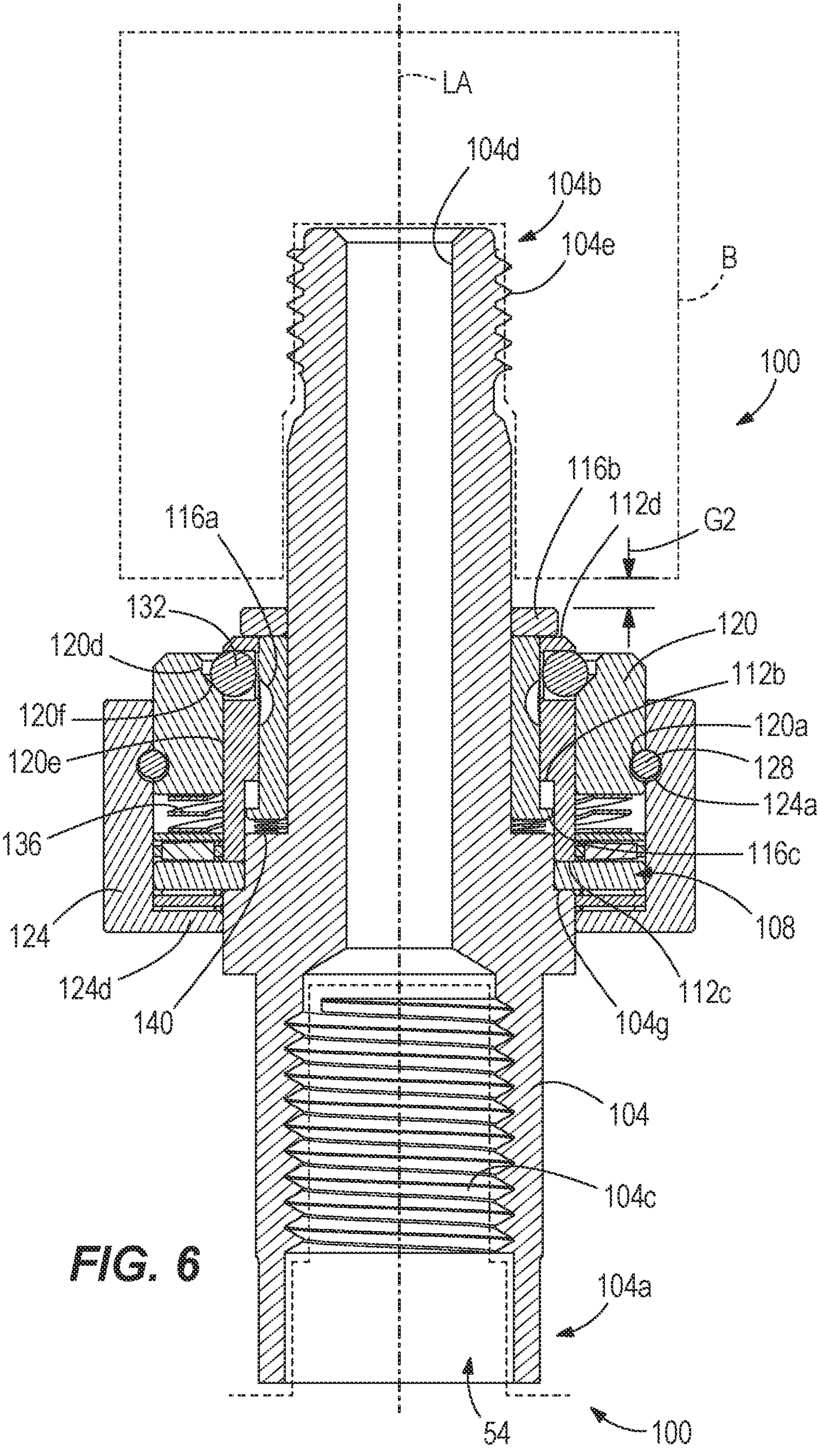
FIG. 6 is a section view of the bit holder in a retracted and disengaged position.

Once in the retracted position (FIG. 5), the inner ring 116 is no longer axially fixed by the locking balls 132. The axial force exerted by the tool bit B on the first end projection 116*b* (due to the preload on the threads 104*e* applied when first attaching the tool bit B, and which preload may be amplified by operating the core drill 14), may then be immediately dissipated by moving the inner ring 116 against the bias of the inner ring spring 140 to a disengaged position, illustrated by FIG. 6. In FIG. 6, the first end projection 116*b* is shown spaced from the tool bit B by a gap G2 to illustrate movement of the inner ring 116; however, the inner ring 116 need only move a small distance in order to release the preload and frictional force developed between the tool bit B and the first end projection 116*b*. In addition, the inner ring spring 140 may optionally maintain the first end projection 116*b* in contact with the tool bit B, even in the disengaged position.

With the friction force between the tool bit B and the first end projection 116*b* released, the user is able to easily unthread the tool bit B from the external threads 104*e* of the main body 104, without requiring the use of a wrench or other external tools. Once the tool bit B is loosened, the user may release the outer sleeve 124. The inner ring spring 140 and inner sleeve spring 136 restore the inner ring 116 and inner sleeve 120 back to their home position (FIG. 4), in which the locking balls 132 again axially secure the inner ring 116.

Although the invention has been described in detail with reference to certain preferred embodiments, variations and modifications exist within the scope and spirit of one or more independent aspects of the disclosure as described.

Various features of the disclosure are set forth in the following claims.

What is claimed is:

1. A bit holder comprising:

a main body extending along a longitudinal axis and including an attachment end configured to be coupled to an output spindle of a power tool, and a tool bit end configured to be threadably coupled to a tool bit;

a first ring;

a second ring selectively movable relative to the first ring, the second ring defining a stop configured to engage the tool bit when the tool bit is coupled to the tool bit end, the second ring being movable to reduce a friction force between the tool bit and the stop and a ring spring positioned between the main body and the second ring to bias the second ring and the stop thereof in an axial direction along the longitudinal axis and into engagement with the tool bit when the tool bit is coupled to the tool bit end.

2. The bit holder of claim 1, wherein the first ring is an outer ring positioned radially outboard of the second ring, which is an inner ring.

3. The bit holder of claim 1, wherein first ring includes a shoulder, and the second ring includes an end projection configured to be seated against the shoulder.

4. The bit holder of claim 1, wherein the first ring includes a hole, and the second ring includes a groove, the hole and the groove each being configured to receive at least partially therein a locking ball.

5. The bit holder of claim 4, wherein the locking ball is one of a plurality of locking balls, and the hole of the first ring is one of a plurality of holes, each of the plurality of holes being configured to receive at least a portion of one of the plurality of locking balls therein.

6. The bit holder of claim 1, wherein the ring spring is positioned radially between the main body and the first ring and axially between a shoulder of the main body and the second ring.

7. The bit holder of claim 1, wherein the second ring is movable to a disengaged position in which the stop is spaced from the tool bit by a gap.

8. The bit holder of claim 1, wherein the attachment end is configured to be threadably coupled to the output spindle.

9. A bit holder comprising:

a main body including an attachment end configured to be coupled to an output spindle of a power tool and a tool bit end configured to be threadably coupled to a tool bit;

a first ring having a hole;

a ball positioned at least partially within the hole;

a second ring movable relative to the first ring; and a sleeve including a first inner surface and a second inner surface, the first inner surface and the second inner surface each being configured to abut the ball, the first inner surface having a first diameter larger than a second diameter of the second inner surface;

wherein the sleeve is movable between a home position and a retracted position, in the home position, the sleeve prevents outward movement of the ball such that the ball axially secures the second ring relative to the first ring, and in the retracted position, the first inner surface is aligned with the hole to permit the ball to move away from the second ring and thereby permit movement of the second ring relative to the first ring.

10. The bit holder of claim 9, wherein the sleeve is an inner sleeve, and the bit holder further comprises an outer sleeve and a key ball positioned between the inner sleeve and the outer sleeve.

11. The bit holder of claim 10, wherein the key ball is one of a plurality of key balls.

12. The bit holder of claim 10, wherein the inner sleeve includes an inner sleeve groove, and the outer sleeve includes an outer sleeve groove, the inner sleeve groove and the outer sleeve groove together receiving and sandwiching the key ball between the inner sleeve and the outer sleeve.

13. The bit holder of claim 12, wherein the inner sleeve groove and the outer sleeve groove each include an axial portion extending in a direction parallel to a longitudinal axis of the main body and a helical portion in communication with the axial portion and extending helically about the longitudinal axis.

14. The bit holder of claim 12, wherein the key ball, inner sleeve groove, and outer sleeve groove define a ball screw mechanism that translates rotation of the outer sleeve into axial movement of the inner sleeve to provide a mechanical advantage.

15. The bit holder of claim 14, wherein the mechanical advantage facilitates movement of the inner sleeve against a sleeve spring.

16. The bit holder of claim 9, wherein the sleeve further includes a transition surface between the first inner surface and the second inner surface, the transition surface being configured to abut the ball.

17. The bit holder of claim 9, wherein the sleeve is biased by a sleeve spring toward the home position.

18. The bit holder of claim 9, further comprising a thrust bearing positioned between the first ring and the main body.

19. A power tool comprising:

an output spindle;

a motor coupled to the output spindle, the motor being configured to generate torque to rotate the output spindle, the output spindle being configured to transmit the torque to a tool bit coupled to the output spindle by a bit holder, the bit holder including:

a main body extending along a longitudinal axis and including an attachment end configured to be coupled to the output spindle, and a tool bit end threadably coupled to the tool bit, a first ring, a second ring selectively movable relative to the first ring, the second ring defining a stop configured to engage the tool bit, the second ring being movable to reduce a friction force between the tool bit and the stop, and a ring spring positioned between the main body and the second ring to bias the second ring and the stop thereof in an axial direction along the longitudinal axis and into engagement with the tool bit when the tool bit is coupled to the tool bit end.

* * * * *